United States Patent Office 3,424,585
Patented Jan. 28, 1969

3,424,585

PHOTOSENSITIVE DIAZOTYPE MATERIALS

Ignaz Binzer, New York, N.Y., assignor to Fairmont Chemical Co., Inc., Newark, N.J., a corporation of New Jersey

No Drawing. Filed Feb. 10, 1966, Ser. No. 526,367
U.S. Cl. 96—91 6 Claims
Int. Cl. G03c *1/52*

This invention relates to novel photosensitive diazotype materials and more particularly to a new class of diazonium compounds characterized by the presence of two heterocyclic rings and to their preparation.

It is known that diazonium compounds having a substituted nitrogen atom in the para-position to the diazo group in a benzene ring are light-sensitive to a varying degree. The substituents attached on the nitrogen atom may be alkyl, alkoxyalkyl, aralkyl, alkylol, alicyclic or heterocyclic groups. The nitrogen atom may also be a part of a heterocyclic radical (e.g., morpholine). For the most part, the suitable diazos for the diazotype process are derived from p-phenylenediamine.

The diazotype process generally involves exposing a sheet material, such as paper, cloth, cellulosic composition or polymeric sheet, on which there is coated a thin layer of the aforesaid light-sensitive diazo compound, to an actinic light under a pattern to destroy the diazo where the light strikes and developing an image corresponding to the original pattern by coupling the undecomposed diazo with a coupling component under proper pH condition. In what is known as a wet development or one-component system, the diazo compound and the coupler are maintained separately, the former on a sheet and the latter in a developing solution. After exposing to the actinic light, the exposed sheet is brought into contact with the developing solution to bring about the coupling thus forming an azo dye image corresponding to the original pattern.

An ideal diazotype reproduction material possesses a combination of properties including good solubility, high photo-sensitivity and strong coupling activity. The sensitized sheet material coated with this diazo should have sufficient shelf life and resistance to extremes of climatic conditions, and the developed image should have high image density, strong contrast, freedom from background discoloration and "bleeding" (diffusion of image), and fastness to light and water. Heretofore, many diazonium compounds have been recommended for use to prepare diazotype materials. While the resultant materials possessed many desirable properties, they fell short of meeting all the requirements of a high quality reproduction material. Oftentimes, a compromise must be made in the preparation of the diazo at the expense of other advantages that may be incorporated into the resultant compound in order to preserve a more desirable property. For example, the size and the complexity of a diazonium compound is generally limited to not more than four carbon atoms in the substituents and not more than one ring so the compound may have the required solubility. However, it is known that the bigger and the more complex the diazo molecule is, the lesser is the tendency for the compound to diffuse.

It is, therefore, the object of this invention to provide a novel class of diazonium compounds which meets the prerequisites of the diazotype art to a very high degree and possesses a combination of properties heretofore unknown. Broadly stated, the photosensitive diazonium compound of this invention has the general formula:

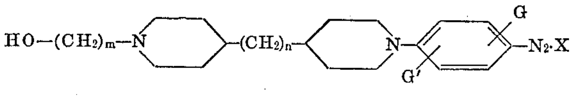

wherein $m$ and $n$ each is an integer from 1 to 4, G and G′ each is selected from the group consisting of hydrogen and alkoxy radicals, and X is an anion.

Advantageously, the novel compounds of this invention are prepared by condensing (I) an aromatic compound of the general formula:

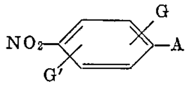

in which G and G′ have the same significance as above depicted, and A is a replaceable group, with a stoichiometric excess amount of (II) a heterocyclic alkylol of the general formula:

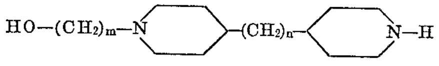

wherein $m$ and $n$ each is an integer 1 to 4. The resultant condensation product which contains the heterocyclic rings is then reduced by a suitable method, and the reduced product is diazotized to the diazonium compound of this invention. A may be a halide such as chloride, bromide and iodide.

Preferably, the aromatic compound that may be employed for the reaction has the general formula:

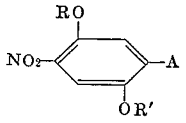

in which A has the same meaning as above stated, and R and R′ each is an alkyl radical containing less than 6 carbon atoms. When this type of aromatic compound is used, the diazonium salt obtained has the general formula:

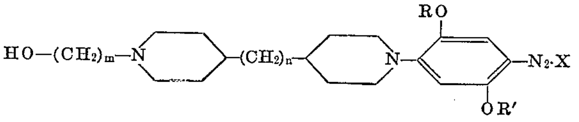

which is particularly suitable as photo-reproduction material in the wet process due to the absence of "bleeding" and high brilliancy of lines in the image in addition to the normal prerequisites of a diazotype material. The lack of "bleeding" may be due to the large and complex diazonium molecule and the brilliancy of lines may be contributed by the presence of N-alkylol group $$HO—(CH_2)_m—$$

It is, however, remarkable to note that the diazonium compound of this invention has the adequate solubility. I have also found that copies made with this diazonium compound show excellent opacity in the dye image for actinic light. Advantageously, they can be used in place of originals for reproduction of additional copies.

The reaction of the nitro compound and the heterocyclic alkylol may be carried out over a wide temperature range depending on the reactants and other reaction variables. In general, there is no advantage in carrying out the reaction below the fluid stage of the reaction or above the decomposition temperature of the reactants. In the preferred process, the temperature range that may be suitable is 100° C.–160° C.

The reduction of the condensation product may be conducted in a conventional manner. Preferably, it is reduced in an alcoholic medium with hydrochloric acid and metallic zinc. Or it may be reduced with hydrogen in the presence of a suitable catalyst or with metallic iron. Upon chilling the reduced compound to 0°–5° C., it is diazotized by the addition of sodium nitrite.

In preparing my novel compounds, I have found it to be convenient to form a double salt of the compound with an organic salt such as, for example, zinc chloride, stannic chloride, cadmium chloride, mercuric chloride, boron trifluoride, etc. The compound thus is isolated in the form of such double salts. It is understood that the anion of the diazonium compound of this invention, as represented by X in the general formula depicted hereinabove, may be a halide, a sulfate, or the like depending on the reaction medium in which the diazonium salt is formed. The anion X may also represent the combined double salt group.

The couplers with which the diazonium salts were employed may be those normally used in diazotype materials. Suitable couplers which may be used with the present diazonium compounds include phloroglucinal, resorcinol, 2,3 - naphthalenediol, m - hydroxyphenylurea, 4,4'-thiodiresorcinol, and 6,7-dihydroxy-2-naphthalene-sulfonic acid.

Further to illustrate this invention specific examples are described hereinbelow. It is understood that the procedures used for preparing the diazonium compound in Example 1 is equally suitable for preparing other diazonium compounds of this invention.

EXAMPLE 1

4-[1'-(N-β-hydroxyethyl-4'-piperidyl)-3'-(4'-piperidyl) propane]-2,5-dibutoxy-benzenediazonium chloride 1 mole 1 - chloro - 4-nitro-2,5-dibutoxy-benzene was heated at 125° C. to 130° C. for 10 hours with 4 moles of 1 - (N - β - hydroxyethyl-4-piperidyl)-3-(4-piperidyl) propane which has the formula:

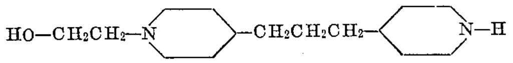

Physical constants of this compound are as follows:

| | |
|---|---|
| Molecular weight | 254.42 |
| Boiling point at 760 mm., ° C. | 359 |
| Freezing point, ° C. | 85.5 |
| Solubility in 100 grams water at 25° C., grams | 0.18 |

The melt from the reaction was drowned in cold water, and the resulting precipitate filtered. The mixture of the reaction product and the unreacted excess heterocyclic alkylol was suspended in water and treated with muriatic acid 20° Bé. until a pH 6 was obtained. At this point, all unreacted heterocyclic alkylol was dissolved and the nitro compound was separated. The unreacted alkylol was recovered by neutralization with caustic. The nitro compound was reduced in methanol with zinc metal and hydrochloric acid. On chilling the reduced solution to 0°–5° C., sodium nitrite in an aqueous solution was added dropwise whereby the diazonium compound was obtained as the zinc chloride double salt which was filtered and dried. It assayed 99%.

EXAMPLE 2

20 gm. of diazonium salt produced in Example 1 together with 10 gm. of citric acid and 40 cc. of diethylene glycol were dissolved in 1000 cc. of water and the solution coated on a standard reproduction paper. When the paper was dried, it was exposed under a pattern to an actinic light and then developed with the following solution:

| | Gm. |
|---|---|
| Phloroglucinol ($2H_2O$) | 3 |
| Resorcinol | 3, 5 |
| Thiourea | 10 |
| Borax | 13 |
| Sodium carbonate | 13 |
| Sodium citrate | 20 |
| Potassium chloride | 50 |

in 1000 cc. of water. A copy was obtained which showed a strong and fine black image.

EXAMPLE 3

The same coated paper as in Example 2 was developed in a more neutral solution which had the following composition:

| | Gm. |
|---|---|
| Phloroglucinol ($2H_2O$) | 6 |
| Disodium phosphate | 60 |
| Sodium citrate | 40 |
| Monosodium tartrate | 25 |
| Saponin | 1 |

in 100 cc. water. The result was a bluish-black image.

I claim:

1. A photosensitive diazonium compound of the general formula:

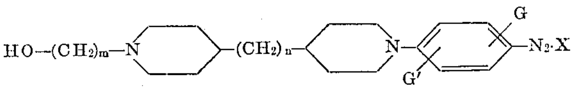

wherein *m* and *n* each is an integer from 1 to 4, G and G' each is selected from the group consisting of hydrogen and lower alkoxy radicals, and X is an anion.

2. A photosensitive diazonium compound of claim 1 wherein the formula of the salt is

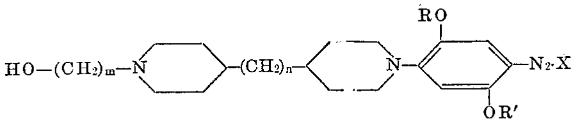

wherein *m* and *n* have the same significance as in claim 1, and R and R' each is an alkyl radical having 1 to 5 carbon atoms, and X is a halogen atom.

3. A photosensitive diazonium compound of claim 2 wherein the formula of the salt is

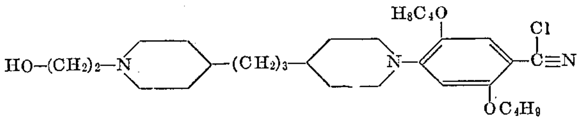

4. A photosensitive composition comprising a diazotype material containing a coupling component and as a light sensitive diazonium compound a heterocyclic diazonium salt of the general formula:

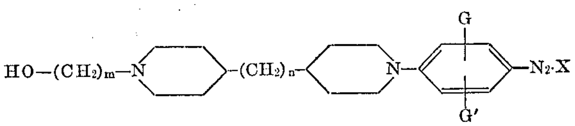

where *m* and *n* each is an integer 1–5, G and G' each is selected from the group consisting of hydrogen and lower alkyloxy radical, and X is an anion.

5. A photosensitive composition of claim 4 wherein said heterocyclic diazonium salt has the formula

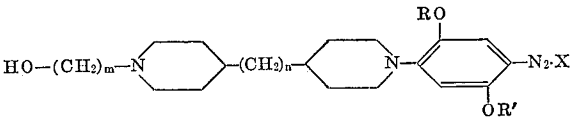

in which R and R' each is a hydrogen or a lower alkyl radical.

6. A photosensitive composition of claim 5 wherein said heterocyclic diazonium salt is 4-[1'-(N-β-hydroxyethyl-4'-piperidyl)-3'-(4'-piperidyl)propane]-2,5-dibutoxy-benzenediazonium chloride.

References Cited

UNITED STATES PATENTS

| | | | |
|---|---|---|---|
| 3,186,845 | 6/1965 | Sus et al. | 96—91 |
| 3,203,803 | 8/1965 | Habib et al. | 96—91 |
| 3,379,531 | 4/1968 | Mizianty et al. | 96—91 |
| 3,294,541 | 12/1966 | Werner et al. | 96—91 |

NORMAN G. TORCHIN, *Primary Examiner.*

C. BOWERS, *Assistant Examiner.*

U.S. Cl. X.R.

96—49; 260—141

UNITED STATES PATENT OFFICE
CERTIFICATE OF CORRECTION

Patent No. 3,424,585 January 28, 1969

Ignaz Binzer

It is certified that error appears in the above identified patent and that said Letters Patent are hereby corrected as shown below:

Column 1, line 29, after "under" insert -- a --. Column 4, lines 41 to 45, the formula should appear as shown below:

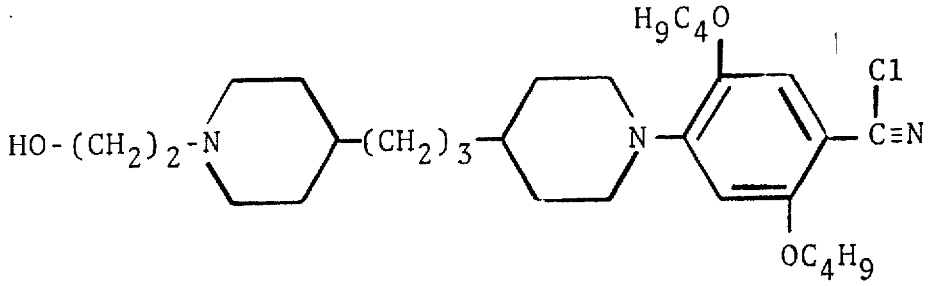

same column 4, line 60, "where" should read -- wherein --.

Signed and sealed this 24th day of March 1970.

(SEAL)
Attest:

EDWARD M.FLETCHER,JR.
Attesting Officer

WILLIAM E. SCHUYLER, JR.
Commissioner of Patents